United States Patent [19]

Spykerman

[11] Patent Number: 5,219,140
[45] Date of Patent: Jun. 15, 1993

[54] EXPANDABLE CONTAINER HOLDER

[75] Inventor: David J. Spykerman, Holland, Mich.

[73] Assignee: Prince Corporation, Holland, Mich.

[21] Appl. No.: 832,025

[22] Filed: Feb. 6, 1992

[51] Int. Cl.$^5$ ............................................. A47K 1/08
[52] U.S. Cl. .................................. 248/311.2; 220/738
[58] Field of Search ............... 248/311.2, 316.6, 314, 248/310, 309.1; 229/1.5 H; 220/738

[56] References Cited

U.S. PATENT DOCUMENTS

| | | |
|---|---|---|
| 3,039,616 | 6/1962 | Proffit . |
| 3,532,318 | 10/1970 | Lloyd . |
| 4,303,109 | 12/1981 | Cohen . |
| 4,417,764 | 11/1983 | Marcus et al. . |
| 4,453,759 | 6/1984 | Kathiria . |
| 4,606,523 | 8/1986 | Statz et al. ........................ 248/311.2 |
| 4,634,089 | 1/1987 | Wright et al. ..................... 248/311.2 |
| 4,645,157 | 2/1987 | Parker ............................. 248/311.2 |
| 4,655,425 | 4/1987 | Wallace et al. ................... 248/311.2 |
| 4,678,154 | 7/1987 | McFarland ....................... 248/311.2 |
| 4,759,584 | 7/1988 | Dykstra et al. . |
| 4,767,092 | 8/1988 | Weatherly ....................... 248/311.2 |
| 4,801,060 | 1/1989 | Thompson . |
| 4,818,017 | 4/1989 | Dykstra et al. . |
| 4,828,211 | 5/1989 | McConnell et al. .............. 248/311.2 |
| 4,892,281 | 1/1990 | DiFilippo et al. ................ 248/311.2 |
| 4,928,873 | 5/1990 | Johnson ........................... 229/1.5 H |
| 4,955,571 | 9/1990 | Lorence et al. .................. 248/311.2 |
| 5,007,610 | 4/1991 | Christiansen et al. ........... 248/311.2 |
| 5,042,770 | 8/1991 | Louthan .......................... 248/313 X |
| 5,071,100 | 12/1991 | Sweeny ......................... 248/311.2 X |
| 5,072,909 | 12/1991 | Huang ............................. 248/311.2 |
| 5,149,032 | 9/1992 | Jones et al. ...................... 248/154 |

Primary Examiner—Ramon O. Ramirez
Attorney, Agent, or Firm—Price, Heneveld, Cooper, DeWitt & Litton

[57] ABSTRACT

A container holder for vehicles includes an aperture that can be automatically adjusted in size to accommodate differently sized containers. In one embodiment, a container holder includes a resilient sidewall with overlapping ends and locking mechanism for adjustably locking the sidewall into a selectable diameter. In another embodiment, a container holder includes a base having a first aperture, a movable plate pivotally mounted to the base having a second aperture aligned with the first aperture, and a bias spring biasing the plate toward an angled position whereby the projected area of the second aperture is reduced so that the plate moves and container holder automatically adapts in size to a container placed in the first and second apertures.

20 Claims, 3 Drawing Sheets

EXPANDABLE CONTAINER HOLDER

BACKGROUND OF THE INVENTION

The present invention relates to container holders for vehicles, and in particular to a container holder adapted to hold differently sized containers.

Vehicle drivers and passengers often carry beverages with them to drink while traveling. However, containers vary widely in size and shape. Thus, to accommodate all containers, a holder must be able to hold cans, tapered cups which may be made of relatively fragile foam material, or large mugs with handles. Different drivers and passengers use these differently sized containers and a driver may use a container at the same time as a passenger using a different sized container.

Some efforts have been made to provide container holders which will accommodate different sized containers. Such structures include, for example, adjustable opposed arms. Also, some container holders, such as that shown in U.S. Pat. No. 4,818,017 accommodate, to some extent, different sized containers by providing resilient side supports. Although the latter design has met with success, the design does not allow fixed adjustability in which the side support can be adjusted to a variety of then fixed diameter supports for different sized containers. Thus there is a continuing need to provide a container holder that is conveniently adjustable for all container sizes.

SUMMARY OF THE INVENTION

The present invention is embodied in a container holder for a vehicle that includes a resilient curvilinear wall with overlapping free ends movable toward and away from each other to vary the diameter of a container holding opening defined by the wall. The wall preferably includes means for locking the ends to a selected adjusted position to present a container holder with a selected diameter but then fixed sides. Means are provided for mounting the wall to a vehicle in position to serve as a container holder. In a preferred embodiment the container holder further includes floor means for supporting the bottom of a container.

In another embodiment, a container holder is provided including a base having a first aperture, and a plate including a second aperture mounted to said base under the first aperture. The plate is biased to project the second aperture toward the first aperture to define an opening that is less than that of the first aperture. The plate is movably mounted to the base and movable from an angled position projecting said second aperture toward said first aperture in response to the insertion of a container having a diameter larger than said second aperture to vary opening of the support for adapting the container holder to hold differently sized containers.

The present invention thus provides a container holder that is adjustable to facilitate the receiving and holding of differently sized containers. In one embodiment, the aperture size is lockably adjustable so that a given size of aperture is maintained once adjusted. Further, the container holder is moldable in one piece to minimize manufacturing costs. The preferred embodiment also includes a pivotable attachment and also a removable attachment of the container holder to a vehicle. Another embodiment includes a pivoting plate that automatically adjusts to variously sized containers and responds to the size of the container placed therein to adjust itself for supporting different sized containers.

Further, the container holder according to one embodiment of the invention defines a box-like shape adapted to catch and contain spilled liquids therein for later disposal.

These and other features, objects and advantages of the present invention will become apparent upon reading the following description thereof together with reference to the accompanying drawings.

DETAILED DESCRIPTION OF THE PREFERRED EMBODIMENT

Figure 1:
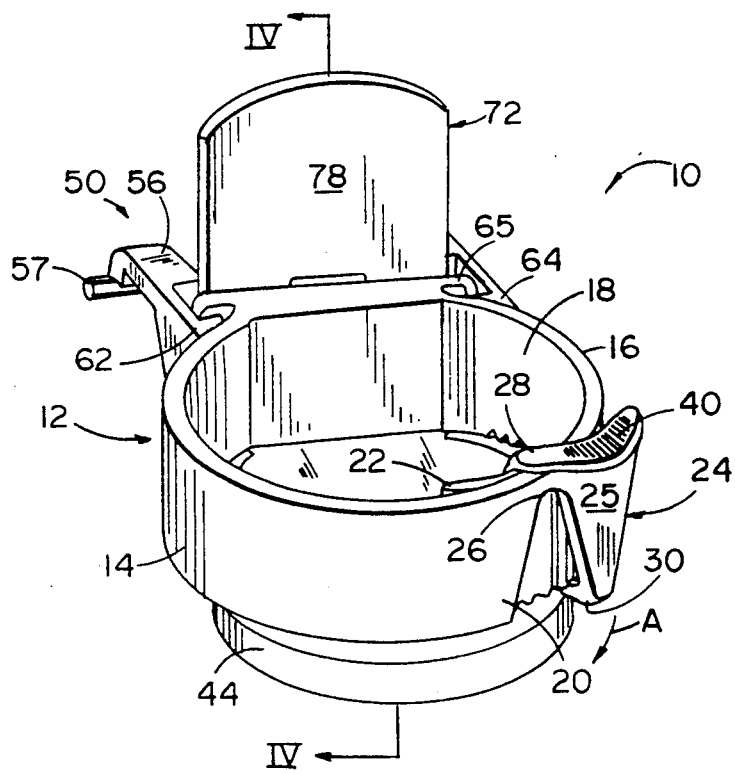
FIG. 1 is a perspective view of a container holder embodying the present invention.
Figure 6:
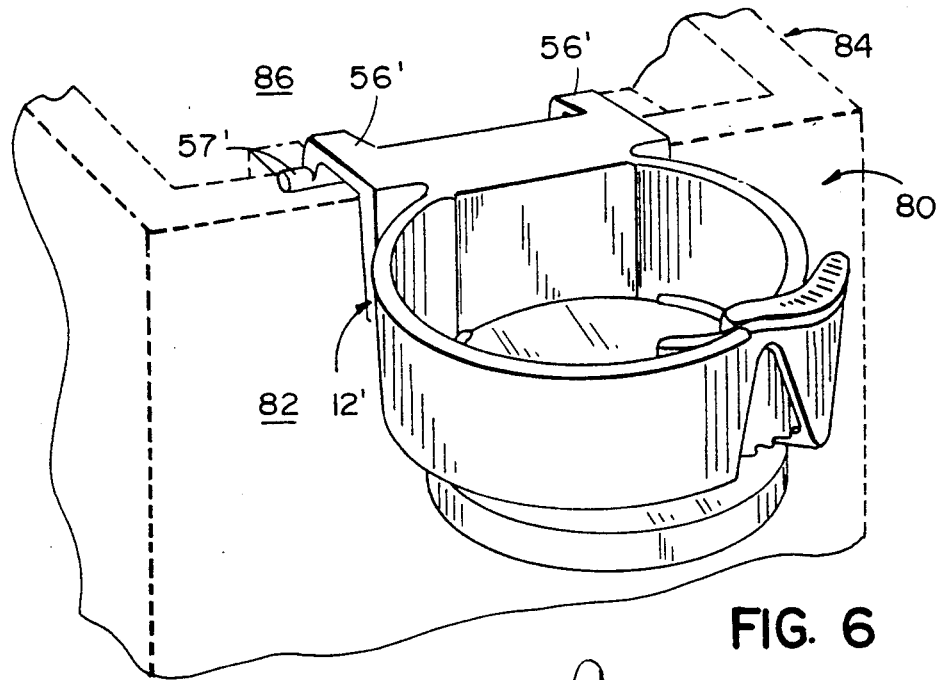
FIG. 6 is a perspective view of another embodiment of a container holder embodying the present invention.

A container holder 10 embodying the present invention is generally illustrated in FIG. 1 and typically is of the type which is mounted within the storage area of an armrest such as armrest 84 illustrated in FIG. 6. Container holder 10 is particularly adapted to be easily adjusted to receive differently sized containers. Container holder 10 includes a base 12 including an upwardly extending and outwardly tapered resilient sidewall with sections 14 and 16 extending arcuately forwardly from a mounting member to form an adjustably sized aperture 18 for receiving differently sized containers (not shown) such as pop cans, cups, mugs, and the like. Sidewall sections 14 and 16 include free ends 20 and 22, respectively, that overlap and are slideably adjustable past each other. A locking mechanism 24 is mounted on free end 20 by a resilient web 26 integral with wall section 14. Locking mechanism 24 includes a triangularly-shaped member 25 with inwardly extending overhanging lip 28 and underhanging lip 30 that form a C-shaped opening for slideably guiding free end 22 within locking mechanism 24 and adjacent free end 20. Further, lips 28 and 30 are vertically offset from each other with overhanging lip 28 positioned adjacent web 26, and underhanging lip 30 positioned a distance away from web 26. Thus, as triangularly-shaped member 25 is pivoted downwardly about web 26, underhanging lip 30 is moved away from the bottom edge 34 of sidewall 16 as shown by arrow "A".

Figure 2:
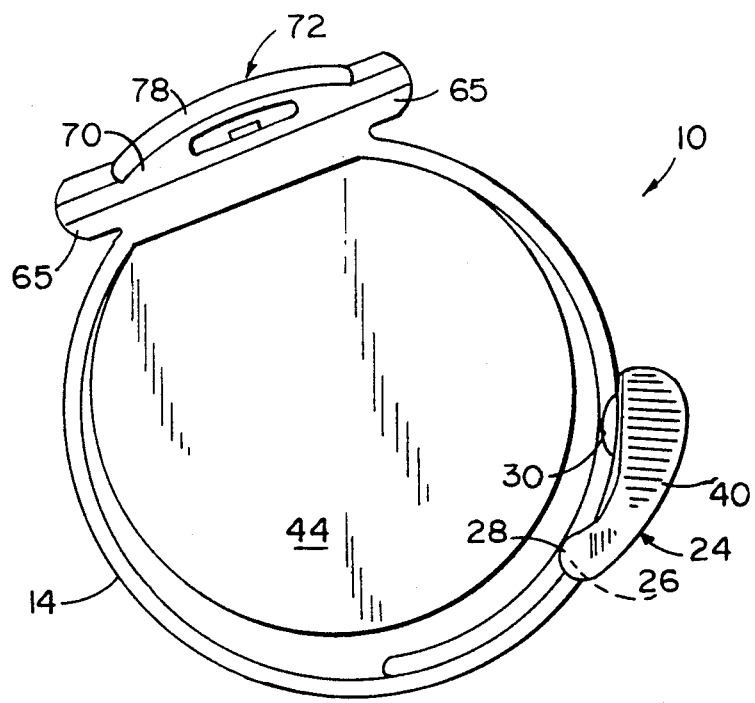
FIG. 2 is a top plan view of the container holder shown in FIG. 1.
Figure 3:
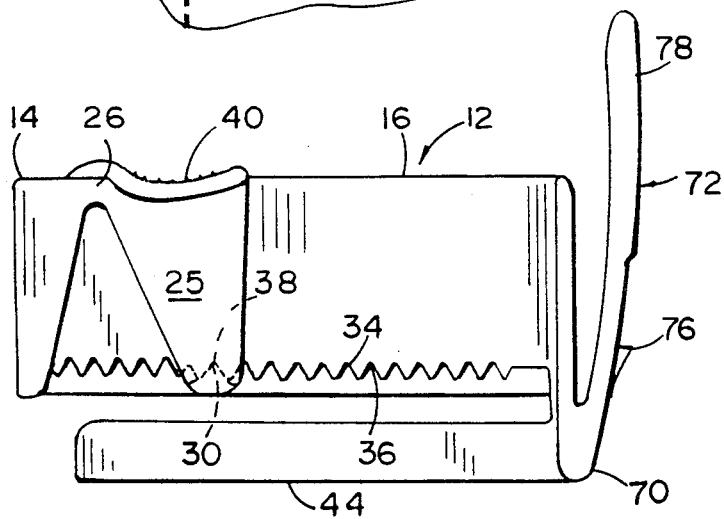
FIG. 3 is a side elevational view of the container holder shown in FIG. 1.

Bottom edge 34 (FIG. 3) of sidewall section 16 includes a plurality of tooth-like depressions 36 along its length. Underhanging lip 30 includes an upstanding tooth 38 adapted to engage depressions 36, with web 26 biasing underhanging lip 30 into engagement with bottom edge 34, thus forming an adjustable locking mechanism for holding the ends of wall sections 14 and 16 at a selected adjusted position. The upper part of triangularly-shaped member 25 forms a push-button release 40 (FIGS. 1-3) that can be conveniently pressed to pivot member 25 on web 26 to release tooth 38 from one of depressions 36.

As button 40 is pressed, the preset memory in the polymeric resilient sidewall sections 14 and 16 automatically move toward a given sized aperture 18. It is contemplated that resilient sidewall sections 14 and 16 could be preset in a relatively small arcuate shape so that as button 40 is pressed the ends 22 and 24 sidewalls 14 and 16 automatically close on a given container placed therein. Alternatively, sidewall sections 14 and 16 could be preset to a relatively large arcuate shape so that as button 40 is pressed, sidewalls 14 and 16 automatically open to form an enlarged size aperture 18. Once a given container is placed therein, sidewalls 14 and 16 can then be squeezed to form an aperture 18 of the desired size.

A support floor 44 (FIGS. 1 and 3) extends horizontally from base 12 under aperture 18 to provide vertical support for the bottoms of containers placed in aperture 18. Advantageously base 12, sidewall sections 14 and 16 and locking mechanism 24 can all be integrally molded in a single one-piece molding. As molded, sidewall sections 14 and 16 would of course not be connected, and must be operably connected by extending free end 22 inside of locking mechanism 24. Floor 44 could, in some embodiments, be eliminated.

Figure 4:
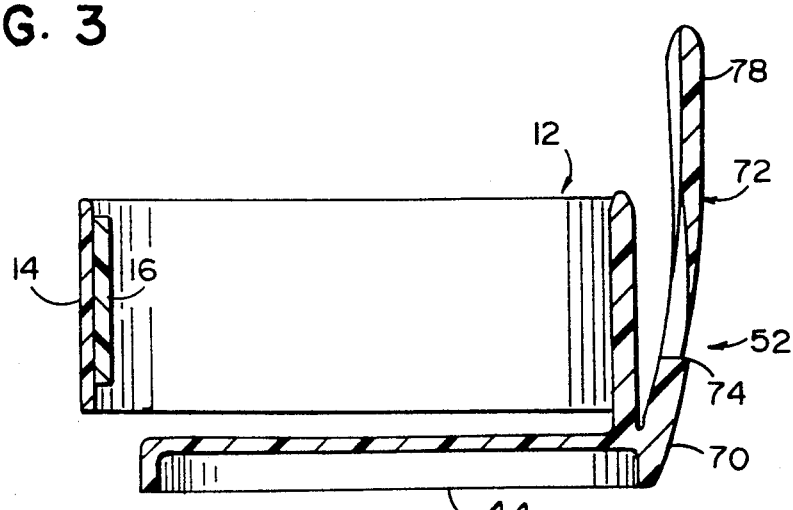
FIG. 4 is a cross-sectional view of the container holder shown in FIG. 1 taken along the section line IV—IV of FIG. 1.
Figure 5:
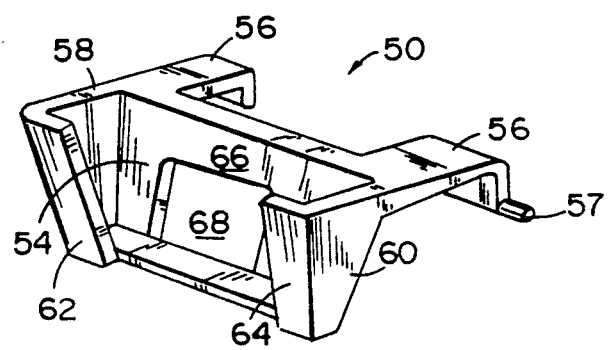
FIG. 5 is a perspective view of the detachable pivoting bracket shown also in FIG. 1.

Container holder 10 also includes a mechanism for releasably attaching container holder 10 to the vehicle. In the embodiment illustrated, base 12 includes a mounting structure 52 (FIG. 4) for engaging a pivoting mechanism or bracket 50 (FIG. 5). Bracket 50 includes a pocket 54 and a pair of rearwardly extending legs 56. Legs 56 include outwardly extending protrusions 57 at their terminal ends for pivotally mounting legs 56 to apertures (not shown) in the vehicle. Pocket 54 includes a forwardly extending pair of sidewalls 58 and 60 with downwardly and inwardly inclined lips 62 and 64. Pocket 54 further includes an inwardly downwardly inclined rear wall 66 with an aperture 68 therein.

Mounting structure 52 of base 12 (FIG. 4) includes a rearwardly extending arm 70 with notches 65 (FIGS. 1 and 2) in its sides to engage lips 62 and 64. An upwardly extending latching leg 72 is connected to arm 70 by a resilient spring arm 74 which biases a tooth 76 on latching leg 72 into engagement with aperture 68. Latching leg 72 further extends upwardly forming a depressible tab 78 for releasing tooth 76 from aperture 68.

In another embodiment (FIG. 6), a container holder 80 is formed that substantially incorporates bracket 50 of container holder 10 into base 12 thus forming a one-piece container holder 80 that can be directly attached to the vehicle. For container holder 80, parts similar to holder 10 are identified by a prime beside the identifying number. In container holder 80, legs 56' extend rearwardly directly and integrally from the top of base 12', and include outwardly extending protrusions 57' for pivotally attaching to the vehicle.

The construction of container holders 10 and 80 allow them to mount to a front wall 82 of an armrest 84 (FIG. 6), and pivot between a use position (shown) and a rearwardly pivoted storage position in a recess 86 of armrest 84. In the use position, legs 56' of container holder 80 (or legs 56 of container holder 10) rest on front wall 82 to support the container holders. In the embodiments shown in FIGS. 1-6 the container holders are integrally molded of a suitable polymeric material such as ABS, polycarbonate or the like.

Figure 7:
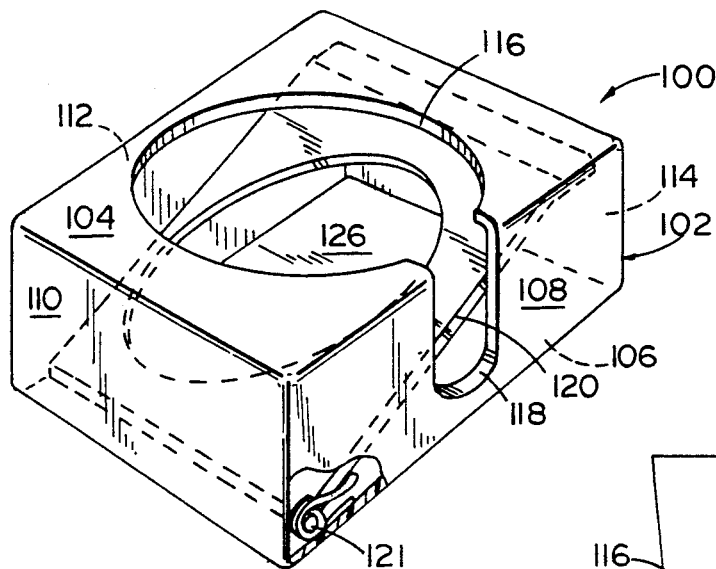
FIG. 7 is a perspective view of a container holder of yet another embodiment of the present invention.

In yet another embodiment (FIGS. 7-9), a container holder 100 is shown that also embodies the present invention. Container holder 100 includes a hollow boxlike base or housing 102 that includes a top 104, a bottom or floor 106, and sides 108, 110, 112 and 114. Housing 102 is liquid tight, and is thereby adapted to contain small amounts of spilled liquid so that it can be disposed of at a later time. Top 104 includes an aperture 116 with a slot 118 that extends from aperture 116 across one edge of top 104 and down side 108. Slot 118 is adapted to receive the handle 109A (FIG. 9) of a coffee mug 109 or cup.

Figure 8:
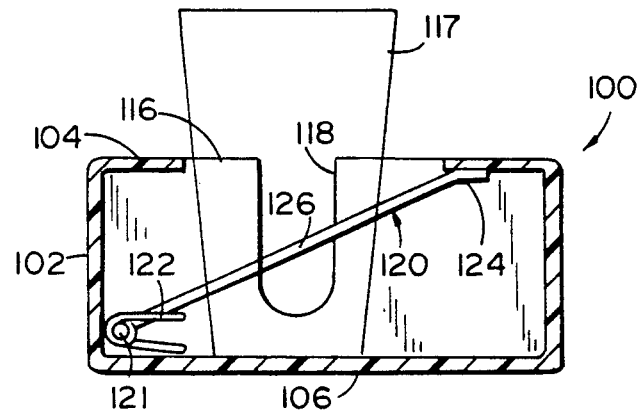
FIG. 8 is a vertical cross-sectional view of the container holder shown in FIG. 7 shown with a tapered container supported therein.
Figure 9:
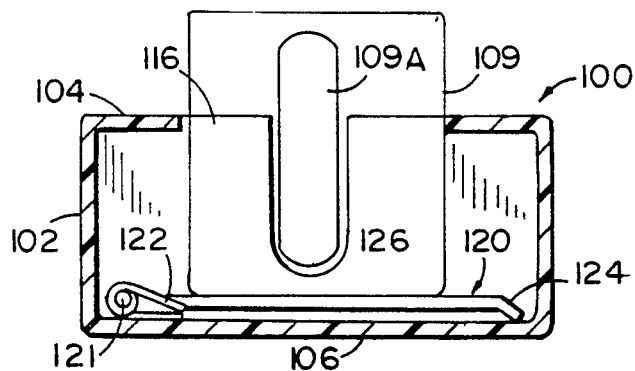
FIG. 9 is a vertical cross-sectional view of the container holder shown in FIG. 7 shown with a mug supported therein.

A planar plate 120 is pivotally mounted along first edge 122 within base 102 near floor 106 by means of a pivot pin 121. In the embodiment shown, plate 120 includes a first edge 122, an opposing second edge 124, and an intermediate body portion that includes an aperture which defines the second aperture 126 of container holder 100. Plate 120 is biased upwardly by coil spring 122 so that its inclined second edge 124 is normally held under the inner surface of top 104 as seen in FIG. 8. Upon the placement of a container within aperture 116 of base 102 which is larger than aperture 126 of plate 120 the container pivots plate 120 downwardly to rest against floor 106 as seen in FIG. 9.

Thus, the plate 120 pivots to vary the effective aperture presented by container holder 100 in supporting a container therein. Thus, differently sized containers can be placed through apertures 116 and 126 and the container holder automatically adjusts to hold larger or smaller containers securely therein. Significantly, aperture 126 is smaller in at least one direction than aperture 116. Thus, most beverage cans, pop cans, or drinking glasses such as glass 117 will fit through both apertures 116 and 126 (FIG. 8), while most mugs such as mug 109 will not fit through aperture 126 (FIG. 9) and as it is extended through larger aperture 116, it engages the outer marginal edge 128 around aperture 126 thus forcing plate 120 to a fully lowered position.

Thus, an adjustably sized container holder is provided for adjustably receiving differently sized containers. In the preferred embodiments of the invention, the container holder includes in one instance resilient side walls that can be adjusted to vary the aperture size for receiving containers, and includes in another instance a plate that pivots to present a reduced projected area of an aperture for receiving containers. It will become apparent to those skilled in the art that various modifications to the preferred embodiments of the invention can be made without departing from the spirit or scope thereof as defined by the appended claims.

The embodiments of the invention in which an exclusive property or privilege is claimed are defined as follows:

1. A container holder for a vehicle comprising:
   a base;
   flexible wall means attached to said base, said wall means movable for defining a plurality of selectable aperture sizes, each being a discretely different diameter for holding containers of different sizes; and
   push button means for releasably securing said wall means in a selected one of said aperture sizes.

2. The apparatus as defined in claim 1 wherein said wall means is an arcuately-shaped sidewall having overlapping free ends which move relative to one another for varying the dimension of said aperture means.

3. The apparatus as defined in claim 2 wherein said means for releasably securing includes an integrally molded locking means for adjustably locking said sidewall in a given arcuate shape, and further includes a resilient web for biasing said locking means into engagement with said sidewall.

4. A container holder for a vehicle comprising:
a base;
flexible wall means attached to said base, said wall means movable for defining a plurality of selectable aperture sizes, each being a discretely different diameter for holding containers of different sizes, said wall means including an arcuately-shaped sidewall having overlapping free ends which move relative to one another for varying the dimension of said aperture means; and
locking means for adjustably locking said sidewall in a given arcuate shape, said locking means including a plurality of teeth formed in said wall means near one end and a locking arm coupled near the opposite end of said wall means, said locking arm including a push button for releasing said locking arm to allow said wall means to move.

5. The apparatus as defined in claim 4 wherein said sidewall is made of a resilient polymeric material having a preset arcuate shape, whereby the size of said aperture means can be adjusted by pressing said push button to automatically move said arcuate wall to reform said aperture.

6. A container holder for a vehicle comprising:
a base adapted to attach to a vehicle;
a resilient sidewall with fee ends extending form said base defining an aperture for holding a container, said aperture being adjustable in size for receiving differently sized containers; and
locking means for adjustably locking said free ends together, said locking means including a push button release that can be pressed to release said free ends for adjusting said aperture size, whereby said aperture can be adjusted to receive the differently sized containers.

7. The apparatus as defined in claim 6 wherein said locking means includes a releasably interlocking tooth mechanism.

8. A container holder for a vehicle comprising:
a base adapted to attach to a vehicle;
a resilient sidewall with free ends extending from said base defining an aperture for holding a container, said aperture being adjustable in size for receiving differently sized containers; and
locking means for adjustably locking said free ends together so that said aperture can be adjusted to receive the differently sized containers, said locking means including a releasable interlocking tooth mechanism, said tooth mechanism including a tooth located on one of said free ends, and a plurality of teeth on another of said free ends for operative engagement by said tooth.

9. The apparatus as defined in claim 8 wherein said tooth is operably connected to said one free end by an integral resilient web that biases said tooth into engagement with said plurality of teeth.

10. The apparatus as defined in claim 9 wherein said release button properly connected to said tooth and integrally connected to said resilient web, said release button being depressible to disengage said tooth from said plurality of teeth.

11. The apparatus as defined in claim 10 wherein said container holder is a one-piece molding.

12. The apparatus as defined in claim 11 and further including an integrally formed floor extending under said aperture.

13. The apparatus as defined in claim 6 wherein said sidewall and said locking means are molded as a one-piece molding.

14. A container holder for a vehicle comprising:
a base adapted to attach to a vehicle;
a resilient sidewall with free ends extending forms said base defining an aperture of holding a container, said aperture being adjustable in size for receiving differently sized containers;
locking means for adjustably locking said fee ends together, whereby said aperture can be adjusted to receive the differently sized containers; and
one of said free ends including guide means for guiding said free end slideably past each other during adjustment of said aperture.

15. The apparatus as defined in claim 6 wherein said sidewall forming said aperture defines a closed loop.

16. A container holder for a vehicle comprising:
a base adapted to attach to a vehicle, said base including leg means for pivotally attaching said base to a vehicle;
a resilient sidewall with free ends extending from said base defining an aperture for holding a container, said aperture being adjustable in size for receiving differently sized containers; and
locking means for adjustably locking said free ends together whereby said aperture can be adjusted to receive the differently sized containers.

17. The apparatus as defined in claim 16 wherein said base includes means for removably attaching said base forms said leg means.

18. The apparatus as defined in claim 6 wherein said base includes mean for removably attaching said container holder to the vehicle, said means for removably attaching including positive retention means that must be released before removing said holder.

19. A container holder for a vehicle comprising:
a base adapted to attach to a vehicle, said base including means for removably attaching said container holder to the vehicle, said means for removably attaching including positive retention means that must be released before removing said container holder;
a resilient sidewall with free ends extending from said base defining an aperture for holding a container, said aperture being adjustable in size for receiving differently sized containers;
locking means for adjustably locking said free ends together, whereby said aperture can be adjusted to receive the differently sized containers; and
said means for removably attaching including a rearwardly extending resilient arm extending from said base, and an upwardly extending latching leg connected to said rearwardly extending resilient arm, said arm and said leg shaped to slide mateably and releasably into a receiving apparatus in a vehicle in which said resilient arm biases said latching leg into frictional engagement with the receiving apparatus to retain said container holder in the receiving apparatus.

20. A container holder for a vehicle comprising:
a container holder member forming an aperture for holding containers; and
means for removably attaching said member to the vehicle, said means for removably attaching including a rearwardly extending resilient portion extending from said member, and an upwardly extending latching portion connected to said rearwardly extending resilient portion, said portions being adapted to slide mateably releasably into a receiving apparatus in the vehicle whereas said resilient portion biases said latching portion into frictional engagement with the receiving apparatus to retain said container holder in the receiving apparatus.

* * * * *

UNITED STATES PATENT AND TRADEMARK OFFICE
CERTIFICATE OF CORRECTION

PATENT NO. : 5,219,140

DATED : June 15, 1993

INVENTOR(S) : David J. Spykerman

It is certified that error appears in the above-identified patent and that said Letters Patent is hereby corrected as shown below:

Column 5, line 36;
    "form" should be --from--.

Column 5, line 67;
    Delete "wherein said" and insert therefor --including a--.

Column 5, line 68;
    "properly" should be --operably--.

Column 6, line 14;
    "forms" should be --from--.

Column 6, line 15;
    "of" should be --for--.

Column 6, line 18;
    "fee" should be --free--.

Column 6, line 39;
    "forms" should be --from--.

Signed and Sealed this

Nineteenth Day of April, 1994

BRUCE LEHMAN

*Attest:*

*Attesting Officer*   *Commissioner of Patents and Trademarks*